United States Patent [19]

Klein et al.

[11] 4,156,556
[45] May 29, 1979

[54] FIBER OPTIC COUPLER WITH CONCAVE SPHERICAL REFLECTING ELEMENTS

[75] Inventors: Aaron D. Klein, Arlington, Va.;
Adolph L. Lewis, La Mesa, Calif.

[73] Assignee: The United States of America as represented by the Secretary of the Navy, Washington, D.C.

[21] Appl. No.: 846,945

[22] Filed: Oct. 31, 1977

[51] Int. Cl.² .............................................. G02B 5/14
[52] U.S. Cl. .............................. 350/96.15; 350/96.18; 350/96.20; 350/294
[58] Field of Search ............... 350/96.15, 96.16, 96.18, 350/96.20, 96.21, 96.22, 294, 299, 304

[56] References Cited

U.S. PATENT DOCUMENTS

| | | | |
|---|---|---|---|
| 3,501,626 | 3/1970 | Benard | 350/294 UX |
| 3,704,996 | 12/1972 | Borner et al. | 350/96.15 |
| 3,811,749 | 5/1974 | Abel | 350/294 X |
| 3,937,560 | 2/1976 | Milton | 350/96.16 |
| 3,963,328 | 6/1976 | Abel | 350/295 |
| 4,057,719 | 11/1977 | Lewis | 350/96.15 X |

*Primary Examiner*—John K. Corbin
*Assistant Examiner*—John D. Lee
*Attorney, Agent, or Firm*—R. S. Sciascia; G. J. Rubens; J. W. McLaren

[57] ABSTRACT

An optical coupler transfers light energy signals relative to an optical path which includes a fiber optic cable. A body member includes first and second ports at opposite ends for supporting first and second terminals of the fiber optic cable in laterally offset alignment relative to each other. First and second reflective elements, preferably of concave spherical configuration, are supported within the body member for collecting and reflecting light energy transmitted through the first and second terminals of the fiber optic cable. The first and second reflective elements are so configured and positioned as to transmit collimated light energy between them for completing the optical path between the first and second terminals of the fiber optic cable. First and second planar reflective surfaces are supported from opposite sides of the body member to intercept a portion of the path of the collimated light energy and are angularly disposed to laterally transfer light energy relative to the optical path between the first and second reflective elements. Preferably, the planar reflector surfaces are removable so as to minimize interference with light energy signal transmission between the collimating reflective elements and reduce attenuation. Additionally, the planar reflector surface may desirably be frequency sensitive so as to extract from or introduce into the optical path only certain selected frequencies of light energy signals.

7 Claims, 2 Drawing Figures

FIBER OPTIC COUPLER WITH CONCAVE SPHERICAL REFLECTING ELEMENTS

BACKGROUND OF THE INVENTION

Recent development and adaptation of optical techniques for application to communications, data processing, and similar signal transmission systems have numerous advantages as compared with electronic systems having analagous objectives.

Low-loss high quality multi-mode fiber optic cables have been developed which renders optical communication, data processing, and signal transmission systems feasible, practical, and desirable.

Some of the advantages of fiber optic cables used in such systems include greatly reduced size, weight, and cost, reduced constraints related to impedance matching, and easy coupling to common logic circuitry by the use of available light sources and light detectors. Moreover, fiber optic cables permit high channel-to-channel isolation, easy interchangeability with electrical cables, and greatly reduced electromagnetic interference.

One of the principal advantages of fiber optic cables in military use is their virtual immunity to radio frequency signals and their characteristic containment of transmitted signals wholly within the cables. In ground communication systems this greatly increases transmission security. Furthermore, the use of optical cables also eliminates cross-talk and the optical paths provided by such fiber optic cables are resistant to electromagnetic interferences from other equipment on an aircraft, vessel, or vehicle, even to the extent of being immune to electromagnetic pulses such as may be generated by nuclear explosions.

In optical systems there is a need for optical couplers which, when connected to fiber optic cables, for example, are capable of intercepting and extracting signal information from an optical path as well as introducing additional signal information into the optical path. It is also highly desirable, that such a coupler be adaptable to perform in a frequency selective manner so as to extract from or introduce into the optical path only light energy signals of certain predeterminable frequencies.

Since the terminal ends of fiber optic cable are known to emit transmitted energy in a conical pattern, it is desirable that such a coupler be designed to efficiently collect the conically emitted pattern of light energy which occurs when a fiber optic cable is parted for the insertion of a coupler for transferring light energy signals in and out of the fiber optic cable.

SUMMARY OF THE INVENTION

The present invention contemplates an optical coupler for transferring light energy signals relative to an optical path which includes a fiber optic cable. The optic coupler of the present invention is contained within an assembly which includes a body member that may preferably be of an essentially rectangular, hollow, box-like configuration.

First and second ports in opposite ends of the body member support first and second terminals of the fiber optic cable relative to which it is desired to insert and extract light energy signals. The first and second terminals of the fiber optic cable which are supported in the body member are positioned in laterally offset alignment relative to each other.

First and second reflective elements, which may preferably be of a concave, spherical configuration, are supported within the hollow body member for collecting and reflecting light energy transmitted through the first and second terminals, respectively. The first and second reflective elements are of a configuration to collimate light which they collect from the conical light pattern emitted by the terminals of a fiber optic cable and the angular disposition of the first and second reflective elements is such as to reflectively transmit the collimated light energy between them for completing the optical path.

In a preferred embodiment of the present invention first and second planar reflective surfaces are supported from opposite sides of the body member, each intercepting the path of collimated light energy and being angularly disposed for laterally transferring light energy relative to the optical path between the first and second reflective elements.

In variant embodiments of the present invention one or two planar reflective surfaces may be employed as required to perform the converse functions of introducing additional light energy signals into the optical path or extracting light energy signals from the optical path of collimated light energy.

A suitable photo-responsive element may be positioned to receive light energy signals reflected out of the optical path by one of the planar reflector surfaces, while an appropriate light energy signal source may be positioned to direct its output to the other planar reflective surface for introducing light energy signals into the optical path.

In a preferred embodiment of the present invention the functions of extracting light energy signals from the collimated optical path, or introducing additional light energy signal information into the optical path may be rendered frequency selective by the employment of a reflective optical film comprising the planar reflective surfaces which is wavelength sensitive, i.e., effective to reflect only certain predeterminable wavelengths of light energy.

Additionally, in a preferred embodiment of the present invention the planar reflective surfaces which intercept the path of collimated light energy may be removable so as to minimize attenuation when not in use for the purposes of either extracting light energy signal information from the optical path or introducing additional light energy signal information into the optical path.

Accordingly, it is a primary object of the present invention to provide an improved optical coupler for transferring light energy signals relative to an optical path which includes a fiber optic cable.

A further important object of the present invention is to provide such an optical coupler which is especially designed to minimize attenuation in the overall optical path by collecting substantially all the light energy emitted from terminal ends of fiber optic cable in an essentially conical pattern.

A further most important object of the present invention it to provide such an optical coupler which includes adjustment capabilities to maximize its efficiency in completing the optical path between two fiber optic cable terminal ends.

Another object of the present invention is to provide such an optical coupler in which the elements employed to extract from or introduce light energy signals into the optical path are readily removable when such functions are not desirable or necessary.

Yet a further object of the present invention is to provide such an optical coupler which is readily adaptable to be made wavelength sensitive through the use of reflective surfaces which reflect only certain predeterminable frequencies of light energy signal information.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENT

Figure 1:
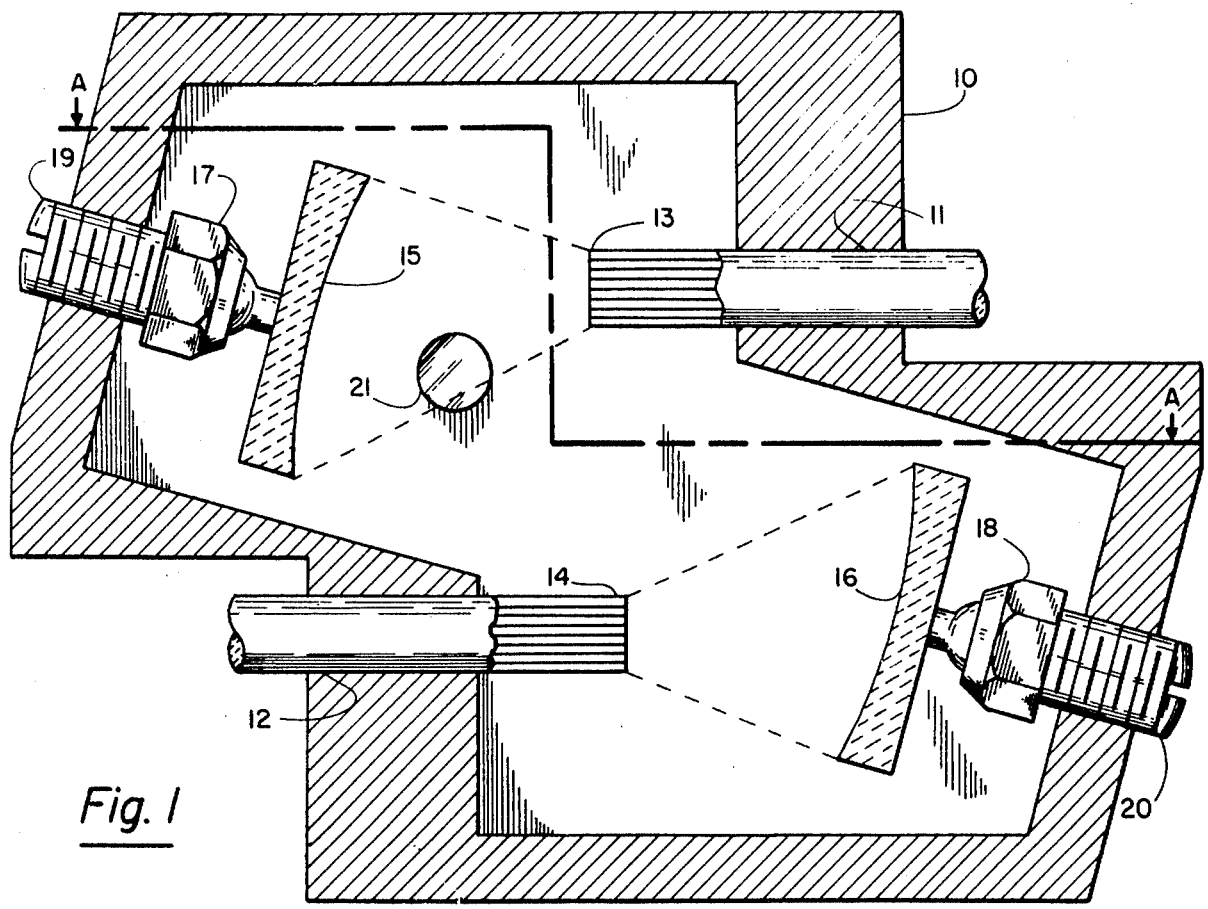
FIG. 1 is a side view cross-sectional illustration of a preferred embodiment of the present invention.

FIG. 1 shows an embodiment of the present invention which includes an assembly supported by and within a body member 10 which may be fabricated of aluminum, for example, or other suitable material. First and second ports 11 and 12 located in opposite ends of the body member 10 support first and second terminal ends 13 and 14 of a fiber optic cable.

First and second reflective elements 15 and 16, which are preferably of a concave, spherical configuration, are supported within the body member 10 for collecting and reflecting light energy transmitted through the first and second terminal ends 13 and 14. The reflective elements 15 and 16 preferably are supported on suitable ball and socket swivel means 17 and 18 to facilitate adjustment of their angular disposition.

The swivel means 17 and 18 are in turn supported from a threaded means 19 and 20, respectively, engaging suitable threads in the ends of the body member 10 and having an external slot or a recess adapted to receive an Allen type wrench for facilitating independent axial alignment and adjustment relative to the first and second optical cable terminals 13 and 14, respectively.

As is fully appreciated by those skilled and knowledgeable in the pertinent arts, light energy emitted from a fiber optic cable and such as 13 or 14 is in the form of a substantially conical pattern as illustrated by the dash lines in FIG. 1. Accordingly, the present invention contemplates concave, spherical reflective elements 15 and 16 which are so dimensioned, configured and disposed as to collect substantially all the light energy emitted from the fiber optic cable ends 13 and 14, respectively.

Additionally, the angular disposition and alignment of the reflective elements 15 and 16 are such as to form an optical path of essentially collimated light therebetween completing the optical path between the fiber optic cable terminal ends 13 and 14. As a result light energy signals emitted from either of the fiber optic cable teminal ends 13 or 14 will be transmitted to the other fiber optic cable terminal end.

In the concept of the present invention, at least one planar reflective surface 21 is supported from a side of the body member 10 in such a position as to intercept a portion of the path of the collimated light energy transmitted between the two reflective elements 15 and 16.

The planar reflective surface 21 is angularly disposed relative to the path of the collimated light energy so as to laterally transfer light energy relative to the collimated optical path. Such laterally transferred light energy may take the form of additional light energy signals introduced into the optical path for transmission together with such other optical light energy signal information as is transmitted through the optical path, or alternatively may take the form of intercepted light energy which is extracted from the light energy signal information transmitted through the optical path. Only one such planar reflective surface is illustrated in FIG. 1; however, a preferred embodiment of the present invention may include first and second planar reflective surfaces as illustrated in FIG. 2.

Figure 2:
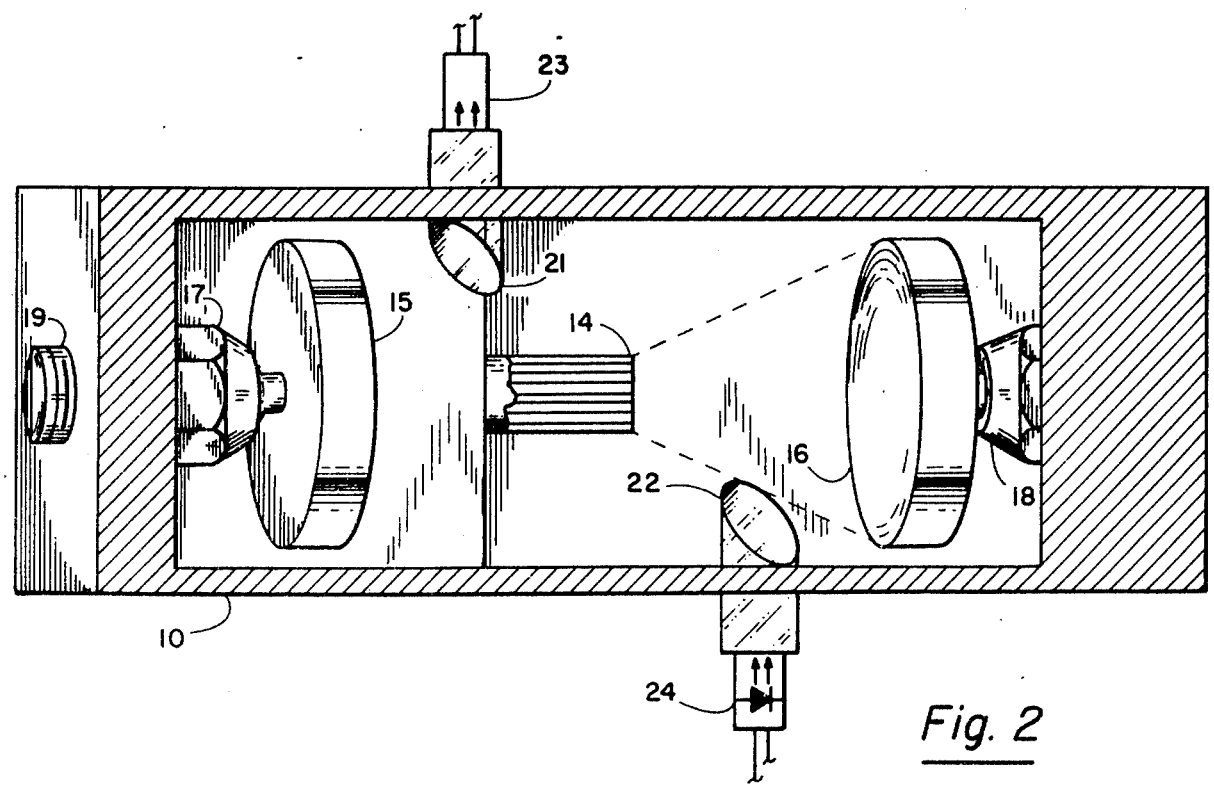
FIG. 2 is a top view cross-sectional illustration of the preferred embodiment of the present invention taken through off-set Section A—A of FIG. 1.

In FIG. 2 like elements bear the same numerical designations as in FIG. 1. As illustrated in FIG. 2, first and second planar reflective surfaces 21 and 22 are supported from opposite sides of the body member 10 and each is disposed for intercepting the path of collimated light energy between the concave, spherical reflective surfaces 15 and 16. Additionally, the first and second planar reflective surfaces 21 and 22 are each angularly disposed for laterally transferring light energy relative to the optical path between the first and second concave, spherical reflective elements 15 and 16.

As illustrated in FIG. 2, a suitable photoresponsive element 23 may be positioned to receive the light energy redirected out of the optical path by the planar reflective surface 21 for the detection of light energy signal information transmitted in that optical path. Conversely, a suitable light energy signal source 24 such as a light emitting diode, for example, may be positioned to direct its output to the other planar reflective surface 22 for introducing additional light energy signals into the optical path for further transmission.

As will be readily appreciated by those skilled and knowledgeable in the pertinent arts, it is desirable that either or both of the planar reflective surfaces 21 and 22 be removable so as to provide minimum interference in the optical path when not actually in use for the purpose of extracting from or introducing light energy signals relative to the optical path. Such removal of the planar reflective surfaces 21 and 22 may be readily affected by mechanical or electromechanical operative means. For example, one such means may comprise a slidably supported rod having an angular, reflectively coated end and being spring-loaded to maintain a predetermined position; solenoid type actuation may be provided to insert and remove the angular reflective surface into and out of the optical path, respectively, as and when desired.

Those knowledgeable in the pertinent arts will appreciate that variant optical configurations other than the concave, spherical reflective surfaces 15 and 16 may be employed to carry out the concept of the present invention in particular applications as may be necessary. Additionally, alternative angularly adjustable means may be employed in lieu of the ball and socket configuration illustrated.

Obviously many modifications and variations of the present invention are possible in the light of the above teachings. It is therefore to be understood that within the scope of the appended claims the invention may be practiced otherwise than as specifically described.

We claim:

1. An optical coupler for transferring light energy signals relative to an optical path including a fiber optic cable comprising:
   a body member;
   first and second ports in opposite ends of said body member for supporting first and second terminals of said fiber optic cable, respectively, in laterally off-set alignment relative to each other;
   first and second concave spherical reflective elements supported within said body member for collecting and reflecting light energy transmitted through said first and second terminals,
   said first and second reflective elements being configured and disposed to transmit collimated light energy therebetween for completing said optical path; and
   at least one planar reflective surface supported from a side of said body member to intercept a portion of the path of said collimated light energy and angularly disposed for laterally transferring light energy relative to said path of said collimated light energy between said first and second reflective elements.

2. An optical coupler as claimed in claim 1 wherein said planar reflective surface is wavelength sensitive.

3. An optical coupler as claimed in claim 1 and including first and second planar reflective surfaces supported from opposite sides of said body member, each intecepting the path of said collimated light energy and angularly disposed for laterally transferrring light energy relative to said optical path between said first and second reflective elements.

4. An optical coupler as claimed in claim 3 wherein said planar reflective surfaces are removable from said body member.

5. An optical coupler as claimed in claim 3 and including a photo-responsive element positioned to receive light energy redirected out of said optical path by one of said planar reflective surfaces, and a light energy signal source positioned to direct its output to the other planar reflective surface for introducing light energy signals into said path of said collimated light energy.

6. An optical coupler as claimed in claim 1 wherein said reflective elements are mounted on swivel means adapted for angular adjustment.

7. An optical coupler as claimed in claim 6 wherein said swivel means are supported on threaded members adapted for axial adjustment relative to said first and second terminals.

* * * * *